Patented Jan. 19, 1926.

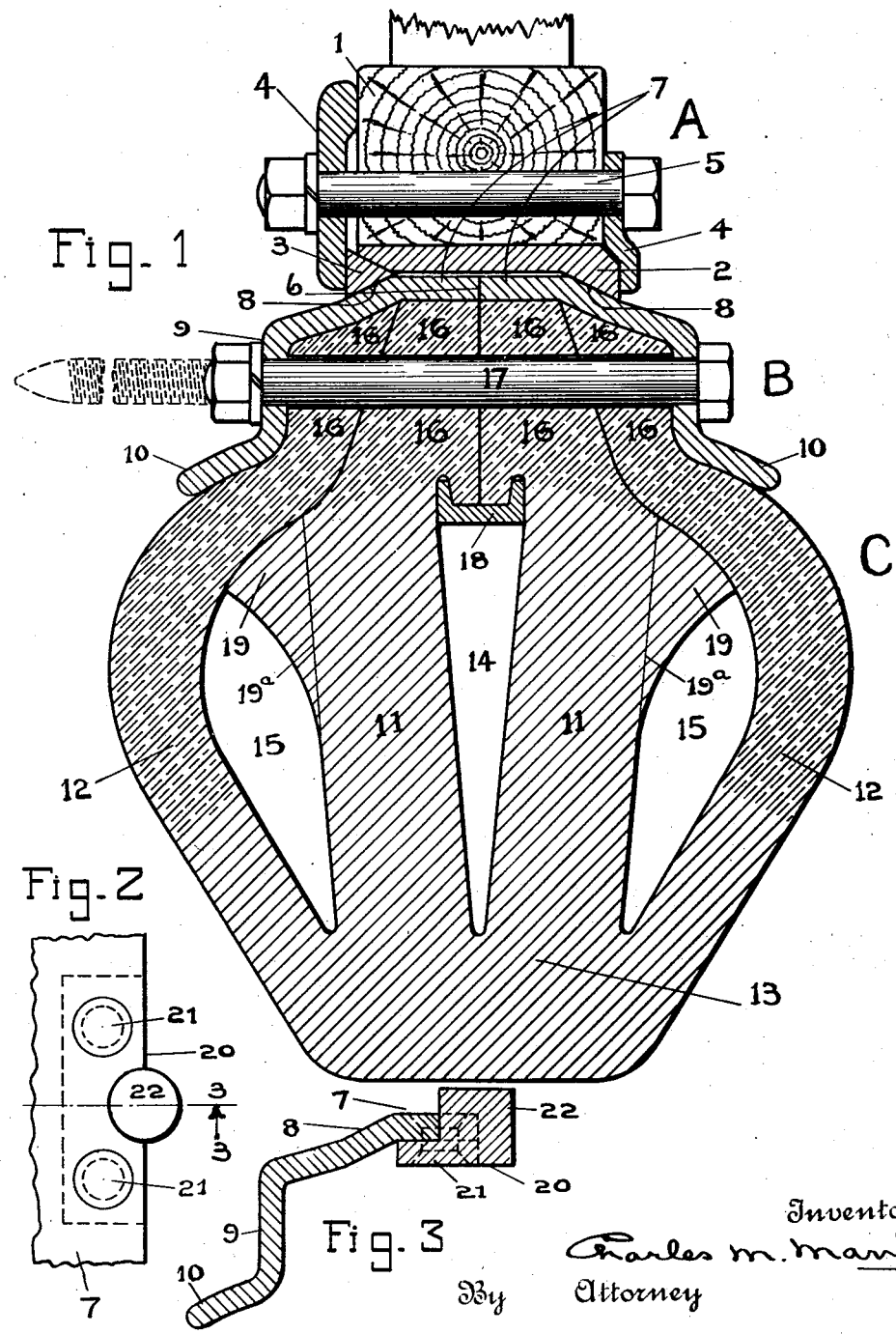

1,570,590

UNITED STATES PATENT OFFICE.

CHARLES M. MANLY, OF RICHMOND HILL, NEW YORK, ASSIGNOR TO O. & W. COMPANY, A CORPORATION OF NEW YORK.

TIRE AND DEMOUNTABLE RIM.

Application filed August 18, 1922. Serial No. 582,673.

*To all whom it may concern:*

Be it known that I, CHARLES M. MANLY, a citizen of the United States, residing at Richmond Hill, New York, have invented certain new and useful Improvements in Tires and Demountable Rims, of which the following is a specification.

My present invention entitled "Improvements in tires and demountable rims" comprises an improved demountable rim which besides having the advantages of greater cheapness and simplicity, is adapted to have a tire applied thereto by simplified means without requiring the use of a press. This rim in its preferred form demountably fits a wheel felloe like any standard, pneumatic tire-rim. Also said rim is circumferentially divided into two lateral parts; and the bolt means which I provide for holding said parts together has a novel coaction with the tire-base, which itself is novel, in the type of tire shown, whereby the base of the tire is advantageously clamped between the flanges of the rim and between the rim and the internal clamping ring. Also the flanges of said rim are novel and advantageously coact with and buttress the walls of the tire. Also there are other features of novelty and advantage in said rim and tire which will appear from an understanding of the following description read in connection with the drawings.

In the drawings, in which I have attempted to show only one of the embodiments my invention is adapted to take, this being the particular embodiment which at present I most prefer,—Fig. 1 is a transverse sectional view through my said improved tire-rim and tire; and through a standard type of wheel felloe for demountable rims, certain of the parts such as the bolts being shown in elevation. Fig. 2 is a plan view of the inner peripheral surface of a fragment of one lateral part of said rim, said fragment embodying a certain lug receivable into the standard transverse notch or recess provided on the wheel's felloe-band to prevent circumferential slip of the tire-rim thereon. Fig. 3 is a cross sectional view through said fragment on the line 3 looking in the direction of the arrow, said cross-section being extended beyond the width of the fragment shown in Fig. 2 so as to include that entire half of the rim with its flange portion.

Describing now my invention with particular reference to the devices of the drawings but without necessarily limiting my invention thereto:—A is a standard wheel-felloe for a standard demountable pneumatic-tire rim; B is my improved tire-rim; and C is one of the forms of tire embodying certain improvements of my own which is adapted to coact with said rim.

The standard felloe A comprises the wheel-felloe 1, having the standard felloe-band 2 mounted thereon, the wedge-sectioned ring or strip 3, and the clamping plates or lugs 4, held together by the bolt means 5 extending through the felloe.

My tire-rim B is adapted to be made by a simple rolling or shaping operation out of uniformly thick sheet metal without any of the up-setting and other operations required to make a standard pneumatic-tire rim with its various juxtaposed thick and thin portions. In my finished rim, the metal is everywhere substantially uniformly thick.

The rim B is circumferentially divided along the line 6 into two preferably duplicate, lateral parts. When these parts are together in their operative position, the rim may be described as comprising a central high substantially cylindrical portion 7 with inclined portions 8 at the sides of said central portion which diverge outwardly to the flanges.

The aforesaid cylindrical portion 7 of the rim is received over the cylindrical portion of the felloe-band 2, and the inclined portions 8—8 coact with the inclined portion of said felloe-band and with the wedging ring 3 as shown in Figure 1.

The flanges of my rim comprise substantially the vertical portions 9 and the portions 10 which diverge sharply outwardly from the lower edges of said vertical portions 9.

The tire shown comprises laterally spaced apart inner members 11 and outer members 12 joined by a tread portion 13, the inner members being separated by the space 14 and each outer member being separated from the adjacent inner member by a space 15, the basal portions 16 of all of the members collectively forming the base of the tire conforming in general shape with the space enclosed by the flanged rim space; and all of said basal ends 16 being clamped together in said space between the two parts of the rim by means of a plurality of bolts 17 located at intervals around the wheel and passing through holes in said vertical portions 9 of the flanges and through holes extending transversely through said basal portions 16 of the tire.

These bolt holes through the tire are purposely made cross-sectionally larger than the bolts 17 so that in the working of the base of the tire when in action the abrading action of the bolts on the rubber material of the tire will be minimized.

The shape of the flanged rim space enables the basal portions 16 of the tire to extend well above the bolts 17 so that the bolt holes through said portions do not unduly weaken them.

18 is an internal clamping ring of any usual or preferred form adapted to compress and clamp the basal portions 16 of the inner members 11 between itself and the rim when the tire is in place as in Figure 1. Said basal portions of the inner members in turn clamp the basal portions of the outer members 12 against the rim and adjacent flanges.

In the particular tire shown the outer members 12 are elbow-shaped with said elbows directed outwardly or away from each other and with the basal limbs of said elbows bearing against and being buttressed extraradially, and extra-laterally by the divergent flange portions 10 thereby increasing the laterally stabilizing effect of said outer members on the tire when in action.

The inner members 11 which are the main load-supporting and shock-absorbing members are increasingly thickened towards their upper portions at the spaces 15 by the lateral extension portions 19 (laterally defined by the imaginary lines 19ª) which bear against the inner sides of the basal limbs of the elbow shaped members 12 and through them are buttressed by the divergent flange portions 10.

The more densely cross-hatched portions of the tire in the drawings are supposed to be more highly vulcanized or made out of a firmer, less yielding rubber material than the other parts of the tire.

Referring now to Figures 2 and 3, 20 is a part preferably a forging of the shape in plan shown in Figure 2 and in cross section shown in Figure 3, having its base portion permanently secured by rivets 21 to the underside of one of the two halves of the flanged rim 7 at the edge where said half of the rim adjoins the other half. Further said forging comprises a cylindrical lug 22, half of whose circular cross-section lies in a semicircular notch formed in said rim-part to receive it and the other half projects laterally towards the adjacent half of the rim which is also provided with a semicircular notch in its edge to receive into it said projecting half of the lug 22 when the two halves of the rim are together.

This lug 22 and the recess in the adjoining half of the rim prevents the two halves of the rim from slipping circumferentially on each other. Also said lug prevents the rim from slipping as an entirety about the felloe-band 2 because the upwardly or radially inwardly directed end of said lug 22 is adapted to be received into the standard transversely extending recess or groove provided in the outer periphery of the standard felloe-band 2 for locking the standard demountable rim against slip on said standard felloe, all as will be well known to those skilled in this art.

The expressions of direction such as "upper" and "lower" and the like used in this description and the accompanying claims refer to the tire positioned as shown in Figure 1 with its tread located downwardly as if in ground contact.

By my above described bolted together two part rim construction I am able to forcibly apply the tire to the rim without the aid of a press usually required for this purpose. To assemble the tire on my rim, it is merely necessary to provide oneself with some additional longer threaded bolts than the bolts 17. These are passed through the flange holes in one half of the rim, then through the holes in the basal portions of the tire and finally through the flange holes in the other half of the rim. The nuts are then applied to the threaded ends of the bolts and are gradually screwed up on said bolts equally all around the rim.

It will be understood that the clamping ring 18 will have been previously properly engaged with the basal portions of the inner members 11 as shown in Figure 1. The described screwing up of the nuts on the long threaded bolts will gradually force the halves of the rim together on to the base of the tire with the basal portions 16 compressed and clamped laterally between the flanges of the rim, and compressed and clamped vertically or radially between the ring 18 and the rim. Thus a press is not needed to put a tire on my rim. Then the long bolts are removed and replaced, one by one, with the short permanent bolts 17.

For greater ease in threading same through the holes in the tire, etc., as aforesaid, the free ends of the long bolts will preferably be tapered or pointed, as indicated by the dotted lines shown at the left hand end of the bolt 17 in Fig. 1.

In addition to what has been shown and described, other changes and modifications may be made in the practical embodiment of my improvements which will, nevertheless, still be within the spirit of the foregoing disclosure and within the meaning and spirit of the annexed claims,—and which as such are accordingly intended to be covered thereby.

What I claim is:

1. In combination, a flanged tire-rim circumferentially divided into two parts; a tire having an internal clamping ring, the base portion of said tire when on the rim being compressed and clamped between said ring and the rim; and bolt means extending through holes in said flanges and base portion and holding together the two parts of the flanged rim with the base of the tire compressed and clamped between said ring and the rim.

2. In combination, a flanged tire-rim circumferentially divided into two parts; a tire having an internal clamping ring, the base portion of said tire when on the rim being compressed and clamped between said ring and the rim; and bolt means extending through holes in said flanges and base portion and holding together the two parts of the flanged rim with the base of the tire compressed and clamped between said ring and the rim; the holes through the base of the tire being larger cross-sectionally than the bolt means to reduce abrasion when the tire is in action.

3. In combination, a flanged tire-rim circumferentially divided into two parts; a tire whose base portion is compressed and tightly enclosed by said rim parts when they have been forced together on said base; and bolt means extending through holes in said flanges and base portion, holding together the two parts of the flanged rim with the base portion of the tire compressed and tightly enclosed as aforesaid.

4. In combination, a flanged tire-rim circumferentially divided into two parts; a tire having a plurality of separate, adjacent, longitudinally extending base-sections; said base-sections being compressed and tightly enclosed by said rim parts when they have been forced together on said base; and bolt means extending through holes in said flanges and base-sections holding together the two parts of the flanged rim with said base-sections compressed and tightly enclosed.

5. A flanged tire-rim adapted to demountably fit a wheel-felloe for a standard rim for a pneumatic tire, said rim being circumferentially divided into lateral parts and consisting of shaped, substantially uniformly thick metal; and bolt means operatively connecting the flanges of said tire-rim through the tire.

6. A tire-rim adapted to demountably fit a wheel-felloe for a standard rim for a pneumatic tire, said rim being circumferentially divided into lateral parts and consisting of shaped, substantially uniformly thick metal; said rim being flanged and having a central, high, substantially cylindrical portion, with inclined portions at the sides of said central portion which diverge outwardly to the flanges; and bolt means operatively connecting the flanges of said tire-rim through the tire.

7. A tire-rim adapted to demountably fit a wheel-felloe for a standard rim for a pneumatic tire, said rim consisting of shaped, substantially uniformly thick metal; said rim being flanged and having a central, high, substantially cylindrical portion, with inclined portions at the sides of said central portion which diverge outwardly to the flanges; said flanges having substantially vertical portions adapted to be connected by bolts passed through holes in said flanges and the base of the tire.

8. A tire-rim adapted to demountably fit a wheel-felloe for a standard rim for a pneumatic tire, said rim consisting of shaped, substantially uniformly thick metal; said rim being flanged and having a central, high, substantially cylindrical portion, with inclined portions at the sides of said central portion which diverge outwardly to the flanges; said flanges having substantially vertical portions adapted to be connected by bolts passed through holes in said flanges and the base of the tire; said flanges having portions which diverge sharply outwardly from the lower edges of their said vertical portions acting as abutments for the upward thrusts from the tire.

9. The combination of a circumferentially divided tire-rim with a tire, said rim having side flanges which have portions extending substantially vertically downwardly from the rim, and thence have portions which diverge sharply away from each other, said tire comprising laterally spaced apart inner and outer members joined by a tread-portion, the basal portions of said members being located in the space enclosed by the rim and said vertical portions of the flanges; means for clamping said basal portions in said space comprising bolt means passing through holes in said portions of the flanges and through said basal portions of the tire members; said outer members of the tire being elbow shaped with their upper limbs outwardly divergent adjacent the aforesaid divergent portions of the flanges.

10. The combination of a circumferentially divided tire-rim with a tire, said rim having side flanges which have portions extending substantially vertically downwardly from the rim, and then have portions which diverge sharply away from each other, said tire comprising laterally spaced apart inner and outer members joined by a tread-portion, the basal portions of said members being located in the space enclosed by the rim and said vertical portions of the flanges; means for clamping said basal portions in said space comprising bolt means passing through holes in said portions of the flanges and through said basal portions of the tire members; said outer members of the tire being elbow shaped with their upper limbs outwardly divergent adjacent the aforesaid divergent portions of the flanges, and said inner members having lateral extensions from their outer sides positioned to seat upon the aforesaid divergent upper limbs of the outer members.

In testimony whereof, I have signed this specification this 17th day of August, 1922.

CHARLES M. MANLY